United States Patent [19]

Nakamura et al.

[11] Patent Number: 4,585,688

[45] Date of Patent: Apr. 29, 1986

[54] THERMOGRAPHIC TRANSFER RECORDING MEDIUM

[75] Inventors: Masaki Nakamura; Shigehiro Kitamura, both of Hachioji; Takao Abe, Tokyo; Tawara Komamura, Hachioji, all of Japan

[73] Assignee: Konishiroku Photo Industry Co., Ltd., Tokyo, Japan

[21] Appl. No.: 688,741

[22] Filed: Jan. 2, 1985

Related U.S. Application Data

[63] Continuation-in-part of Ser. No. 558,786, Dec. 6, 1983, abandoned, and Ser. No. 538,580, Oct. 3, 1983, abandoned.

[30] Foreign Application Priority Data

| | | | |
|---|---|---|---|
| Oct. 4, 1982 | [JP] | Japan | 57-175138 |
| Dec. 13, 1982 | [JP] | Japan | 57-217063 |
| Dec. 15, 1982 | [JP] | Japan | 57-218336 |

[51] Int. Cl.$^4$ .......................... B32B 3/18; B41M 5/26

[52] U.S. Cl. .................................... 428/200; 428/209; 428/211; 428/212; 428/484; 428/488.1; 428/488.4; 428/913; 428/914

[58] Field of Search ........................ 400/120; 427/148; 428/200, 207, 211, 212, 488.1, 488.4, 913, 209, 457, 480, 484

[56] References Cited

FOREIGN PATENT DOCUMENTS

| | | | |
|---|---|---|---|
| 44-16136 | 7/1969 | Japan | 428/914 |
| 2099602A | 12/1982 | United Kingdom | 428/914 |

*Primary Examiner*—Bruce H. Hess

*Attorney, Agent, or Firm*—Jordan B. Bierman

[57] ABSTRACT

A thermographic transfer recording medium comprising a substantially heat-resistive support coated with, in order from the support, a coloring agent layer containing a fusion resistive polymer compound as a binder having a coloring agent dissolved or dispersed therein, and a transferable layer comprising a low melting point compound capable of containing a coloring agent and of transferring an image to a recording paper.

18 Claims, 4 Drawing Figures

THERMOGRAPHIC TRANSFER RECORDING MEDIUM

This Application is a continuation-in-part of (1) Application Ser. No. 558,786, filed Dec. 6, 1983, now abandoned, which claimed priority of Japanese Application No. 218,336/1982, filed Dec. 15, 1982, and (2) Application Ser. No. 538,580, filed Oct. 3, 1983, now abandoned, which claimed priority of Japanese Application Nos. 175,138/1982, filed Oct. 4, 1982, and No. 217,063/1982, filed Dec. 13, 1982.

BACKGROUND OF THE INVENTION

This invention relates to thermographic transfer recording media generally and, more particularly, to those capable of producing an image having rich gradation and excellent preservability on an image receiver.

In thermographic transfer recording apparatus such as thermal printers, thermal facsimiles and the like, a thermographic medium is used to produce and transfer an image onto an image receiver, such as plain paper. To obtain these transfer images, it has been known to heat a material containing a sublimable dye, pigment or the like whereby the dye or pigment is sublimed, fused, or volatilized to produce an image on an image receiver.

However, there are substantial disadvantages in a thermographic transfer recording medium using a sublimable dye. Preservability is poor because the dye density of the transferred image varies moment to moment as a result of the sublimation of the dye, not only before recording, but after as well.

Thermographic transfer recording media using thermally fusible material containing a pigment or the like are advantageous because the preservability is excellent; however, this is offset by the substantial disadvantage that image gradation cannot be shown by changing the optical density of a transferred image per unit transfer area in accordance with the quantitative variations of an image forming material.

Meanwhile, Japanese Patent Publication Open to Public Inspection (hereinafter OPI) No. 68253/1979 has proposed a thermographic transfer recording medium having a finely porous layer comprising a resin and an ink component capable of being fused by heat. This recording medium has also been found to be disadvantageous; its thermal transfer efficiency is poor, fully satisfactory transfer density is not obtainable, unevenness on a transfer image is conspicuous, and image gradation can hardly be obtained.

SUMMARY OF THE INVENTION

It is the purpose of this invention to overcome the disadvantages mentioned above.

It is an object of the invention to provide a thermographic transfer recording medium capable of delivering a transferred image with high maximum density and rich gradation representation by controlling the optical density of a transfer recording image as a function of the heat energy applied.

Another object of the invention is to provide a thermographic transfer recording medium capable of obtaining a transferred image without showing any unevenness.

A further object of the invention is to provide a thermographic transfer recording medium which has high thermal transfer efficiency at the time of transfer recording.

A still further object of the invention is to provide a thermographic transfer recording medium which is excellent in raw preservability, without resulting in undesirable image transfer due to pressure or the like applied before thermal recording.

An additional object of the invention is to provide a thermographic transfer recording medium which is excellent in record-preservability without any change in the dye density of a transferred image after a thermal recording.

The thermographic transfer recording medium of the invention comprises a support having coated thereon, in order, a coloring agent layer comprising a coloring agent and a binder, which binder is a non-heat-fusible polymer compound, and a transferable layer comprising a low melting point compound capable of dissolving or dispersing the coloring agent at the time of fusing.

DETAILED DESCRIPTION OF THE INVENTION

Figure 1:
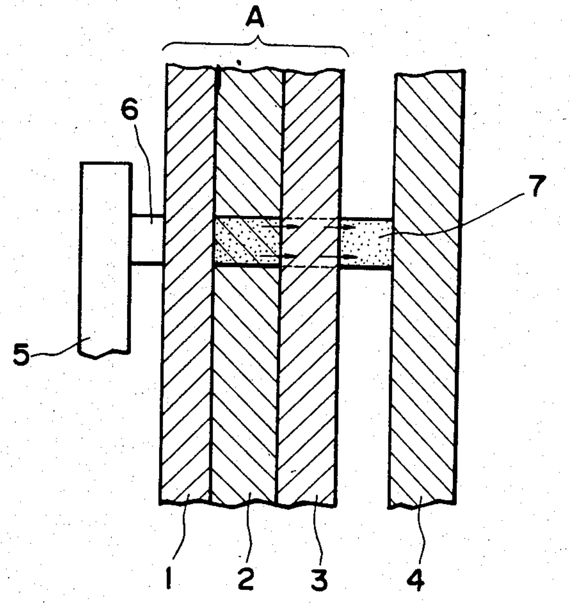
FIG. 1 shows an image being transferred via the thermal recording medium of the present invention.

The invention is a thermographic transfer recording medium having a support, a coloring agent layer and a transfer layer. The coloring agent layer is coated on the support and comprises a coloring agent and a binder. The transfer layer is coated on the coloring agent layer and contains a compound which, upon heating, is capable of dissolving or dispersing the coloring agent therein.

Any support which is not softened by heating at 200° C. or less for a short period of time is capable of being used in the invention. Such supports may include papers, plastics, metals and the like; condenser papers, polyethylene terephthalate films, or aluminum foils are preferable. The thickness of the support may be determined according to the materials used; however, it is generally preferred to be 3 to 40 μm. If it is thinner than 3 μm, a coloring layer and a transferable layer can be coated thereon only with difficulty; if it is thicker than 40 μm it is disadvantageous because heat conduction is reduced to a point where there is insufficient heat delivered to the coloring and transfer layers to properly transfer the image. Still, individual material properties will modify these limits somewhat.

In this invention, the coloring agent layer contains a binder which is a non-heat-fusible polymer compound. This is to thermally stabilize the coloring agent layer so as to prevent transfer thereof onto the image receiver during heating.

The non-heat-fusible polymer compound is a polymer compound having a melting point or a softening point preferably at least 50° C. higher than that of the low melting point material which is to be contained in the transferable layer. The polymer is a macromolecular compound that is not substantially fused by heat during image recording.

Advantageous non-heat-fusible polymer compounds include polyvinyl alcohol, polystyrene, polyvinyl chloride, polyvinyl chloride/vinyl acetate copolymer, polyester, polycarbonate, polyvinyl butyral, polyvinyl formal, polyethylene terephthalate, polyethylene, polyvinylidene chloride, polyamide and the like. Methyl cellulose, gum arabic, casein, gelatin, polypropylene and polyvinyl acetate are also suitable. Polyvinyl butyral, polyester, polyvinyl chloride and polycarbonate are particularly perferred.

Coloring agents useful in the invention are those dyes or pigments which are solid at room temperature and, when being fused, are capable of being dissolved or dispersed in the low melting point compound incorporated in the transferable layer. For this purpose, nitroso dyes, nitro dyes, azo dyes, stilbene azo dyes, ketoimine dyes, triphenylmethane dyes, xanthene dyes, azomethine dyes, acridine dyes, quinoline dyes, methinepolymethine dyes, thiazole dyes, indamine dyes, indophenol dyes, azine dyes, oxazine dyes, thiazine dyes, sulfide dyes, aminoketone dyes, oxyketone dyes, anthraquinone dyes, indigoid dyes and phthalocyanine dyes; colorless or pale-color forming leuco compounds of the above-mentioned dyes, such as triarylmethane compounds, diphenylmethane compounds, xanthene compounds, thiamine compounds, and spiro compounds, provided that said leuco compounds are used in conjunction with, processed with, or contacted with acidic materials that cause the above mentioned leuco compounds to develop a color, such as phenol derivatives and aromatic carboxylic acids; sublimable dyes for use in textile printing, such as azo dyes, anthraquinone dyes and nitrodiphenylamine dyes; inorganic pigments such as chromic acid salts, ferrocyanides, sulfides, sulfates, oxides, hydroxides, silicates, carbonates, carbons and metal powder; organic pigments such as nitroso pigments, nitro pigments, azo pigments and phthalocyanine pigments; and non-dye compounds having their predominant absorption in the visible wavelength region of 400 nm to 800 nm and having melting points in the range of 45° to 200° C., preferably to 45° to 120° C., such as azobenzene derivatives, nitrobenzene derivatives, thiophenol derivatives and aniline derivatives may be used.

Suitable yellow dyes include Kayalon polyester light yellow 5G-5 (Nippon Kayaku Co., Ltd., Japan); Oil Yellow S-7 (Shirato Co., Ltd., Japan); Aizen Spilon GRH Special (Hodogaya Chemical Co., Ltd., Japan); Sumiplast Yellow F-5G (Sumitomo Chemical Co., Ltd., Japan); Aizen Spilon Yellow GRH (Hodogaya Chemical Co., Ltd., Japan); and the like.

Suitable red dyes include Diacelliton Fast Red R (Mitsubishi Chemical Industries, Ltd., Japan); Dianix Brilliant Red BS-E (Mitsubishi Chemical Industries, Ltd., Japan); Sumiplast Red FB (Sumitomo Chemical Co., Ltd., Japan); Sumiplast Red HFG (Sumitomo Chemical Co., Ltd., Japan); Kayalon Polyester Pink RCL-E (Nippon Kayaku Co., Ltd., Japan); Aizen Spilon Red GEH Special (Hodogaya Chemical Co., Ltd., Japan); and the like.

Satisfactory blue dyes include Diacelliton Fast Brilliant Blue R (Mitsubishi Chemical Industries, Ltd., Japan); Dianix Blue EB-E (Mitsubishi Chemical Industries, Ltd., Japan); Kayalon Polyester Blue B-SF Conc. (Nippon Kayaku Co., Ltd., Japan); Sumiplast Blue 3R (Sumitomo Chemical Co., Ltd., Japan); Sumiplast Blue G (Sumitomo Chemical Co., Ltd., Japan); and the like.

The yellow pigments include Hanza Yellow 3G; Tartrazine Lake; and the like. The red pigments to be used include Brilliant Carmine FB-Pure (Sanyo Color Works, Japan); Brilliant Carmine 6B (Sanyo Color Works, Japan); Alizarine Lake; and the like. The blue pigments include Serilene Blue; Sumika Print Cyanine Blue GN-O (Sumitomo Chemical Co., Ltd., Japan); phthalocyanine Blue; and the like. Suitable black pigments include carbon black, oil black, and the like. Particularly preferable are Sumiplast Yellow F5G, Sumiplast Red FB and Sumiplast Blue 3R.

The transferable layers of the present invention each contain a low melting point compound capable of dissolving or dispersing the coloring agent at the time of fusing. As used herein, low melting point compound means a material having a melting point within the range of about 45° C. to about 150° C., and is intended to include materials having a softening point in accordance with Japanese Industrial Standard JIS K 2531 (1956) within the same temperature range. Specific examples thereof include plant waxes, such as carnauba wax, Japan wax, ouricury wax, esparto wax and the like; animal waxes e.g. beeswax, treewax, shellac wax, and the like; petroleum waxes such as paraffin wax, microcrystalline wax, ester wax, oxidation wax, and the like; mineral waxes, e.g. montan wax, ozocerite wax, ceresine wax, and the like; higher fatty acids such as palmitic acid, stearic acid, margaric acid and the like; higher alcohols such as eicosanol and the like; higher fatty acid esters such as cetyl palmitate, myricyl palmitate and the like; and lower amides such as acetamide, propionic acid amide and the like. Particularly preferable are paraffin wax, carnauba wax and ester waxes. Other preferable materials are candelilla wax, behinic acid, xylytol, benzamide, phenylurea, and diethylurea. The low melting point compounds may be used separately or as mixtures.

The coloring agent layers each may also contain a low melting point compound which is capable of dissolving or dispersing the coloring agent at the time of fusing. In this case, the low melting point compound may be either the same as or different from those used in the transferable layer. A preferred coloring agent layer comprises about 5% to about 95% by weight of the non-heat-fusible polymer compound, 0% to about 80% of the low melting point compound, and about 5% to about 50% of the coloring agent.

In the thermographic transfer recording media of the invention, the transferable layers thereof are, basically speaking, made of low melting point compounds. In these layers, the aforedescribed low melting point compounds may be used individually or in combination. These layers may also contain one or more compounds capable of accelerating dissolution of the coloring agent in the low melting point compounds; that is, a heat-solvent such as acetamide, phenyl benzoate, urea or the like.

An interlayer may be located between the coloring agent layer and the transferable layer. The interlayer may either be fused or not when being heated. In the former case, it can be transferred together with the transfer layer and, in the latter case, the low melting point compound of the transfer layer should not inhibit the dissolution or dispersion of the coloring agent. An overcoat layer or a subbing layer may also be included.

One of the preferred methods for recording an image by means of the thermographic transfer medium of the invention is to heat the support on the uncoated side using a heat generating device such as a thermal head, a thermal pen, an iron, or the like. The temperature to which the thermographic transfer recording medium of the invention is heated to transfer the image onto the image receiver is determined by taking the relationship between temperature and heating time, the melting point of the low melting point compound to be used in a transferable layer, etc. into consideration. Preferably, the thermographic medium should be at or above room temperature and, more preferably, at a temperature of at least 45° C.

By making use of a thermographic transfer recording medium of the invention, an image can be recorded on an image receiver; for example coated papers, plain papers such as drawing papers, resin films, such as polyethylene terephthalate films, and the like. A suitable image receiver preferably has excellent flatness and, more preferably, a smoothness as determined with a Bekk smoothness tester (JIS P8119) of at least 100 seconds. Still more preferably the receiver should have smoothness of at least 200 seconds, and a value of 300 seconds or more is most preferable.

The medium is formed by coating a coloring agent layer and a transferable layer onto a support. First, if desired, a subbing layer may be provided on the support, before the coloring agent layer is applied, so as to make the coloring agent layer adhere more securely to the support. The coloring agent is dissolved or dispersed in a solution containing the binder, or the coloring agent is dissolved or dispersed in the binder fused by heat without using any solvent. The resulting solution is coated on the support to form the coloring agent layer by the usual means such as a wire-bar, a brush, a coater or the like.

Secondly, the transfer layer is prepared by dissolving or dispersing the low melting point compound in a solvent containing no coloring agent. The resulting solution is coated on the coloring agent layer.

In order to provide a good image, each of the layers of the thermal transfer recording medium should have a thickness of about 1 to 20 μm. Preferably, each layer has a thickness of not more than 15 μm, and a thickness of about 2 to 8 μm is even more preferable.

In this invention, the coloring agent is moved from the coloring agent layer into the transferable layer by diffusion or elution of the coloring agent corresponding to the applied heating temperature for the specified time. Only the transfer layer is transferred, the coloring agent layer remains on the support. Accordingly, the optical density of the transferred recorded image obtained by the invention varies with the amount of the coloring agent which moves to the transferable layer.

In other words, when an image is recorded by this method, an intermediate degree of contrast can be obtained by the use of halftone dots or the like, as well as by density modulation; a major advantage over other processes and materials. In addition, the thermographic transfer recording media of the invention have excellent stability because the coloring agent layer is interposed between the support and the transferable layer. This invention represents significant advantages over known methods. Very even density may be obtained, not only in line images, but also in solid images covering wide areas. Furthermore, very delicate gradation can be reproduced.

Preferred examples of the practice of this invention will be described below; however, they are exemplary only and the invention is not intended to be limited thereto. In FIG. 1, support 1 has a thickness of 6 μm. By drying an applied solution, coloring agent layer 2 was formed. Subsequently, a different coating solution is applied on top of the coloring agent layer and dried to form transfer layer 3. In FIG. 1, the resulting recording medium is indicated at A.

EXAMPLE 1

Coating solution 1 was prepared by dissolving 4 g of polyvinyl butyral (softening point 120° C.) in 40 ml of methylethyl ketone. 0.3 g of Sumiplast Blue 3R (Sumitomo Chemical Co., Ltd., Japan) was added thereto. Coating solution 2 was prepared by dissolving 8 g of Paraffin Solid 32030, melting point 62° to 64° C., (Kanto Chemical Co., Japan) in 10 ml of hexane.

Solution 1 was coated on condenser paper by a wire-bar to form the coloring agent layer which was 3.1 μm thick when dried. Next, Solution 2 was coated on the coloring agent layer by the wire-bar to form the transferable layer (2.5 μm dried thickness) while maintaining the temperature at 45° C. This constitutes the thermographic transfer recording medium of the invention.

The coated surface of this recording medium is brought into close contact, face to face, with the surface of a plain paper image receiver. A hot iron was applied to the support side of the medium for one second at 60°, 80°; 100°; and 120° C. to yield blue transferred images, without any unevenness on the plain paper. The respective optical reflection densities (measured by a reflection type densitometer manufactured by Konishiroku Photo Industry Co., Ltd., Japan) were 0.10, 0.38, 0.63, and 0.96, respectively. Thus the optical reflection density of a transferred image was variable.

When the coated surface of a thermographic transfer recording medium of the invention was brought into close contact with a plain paper and some letters were written thereon by a pencil from the support side, nothing was transferred onto plain paper.

COMPARISON EXAMPLE 1

A recording medium was prepared in a manner similar to Example 1 except that only a coloring agent layer prepared with Coating Solution 1 was coated thereon. Image transfer onto a plain paper was attempted using the same transfer process as that applied in Example 1. No transferred image was obtainable when the temperature of the iron was 60° C. or 80° C., and a blue-colored uneven transferred image was obtained when the temperatures of the iron were 100° C. and 120° C. The optical reflection densities of the transferred images were 0.08 and 0.12 when the temperature were 100° C. and 120° C., respectively.

When some letters were written similarly in pencil on the thermographic transfer recording medium obtained in Comparison Example 1, transferred blue-colored letters were observed on the plain paper.

When comparing Example 1 with Comparison Example 1, it was found that no unevenness in transferred image resulted with the invention while, for those images which did transfer in the Comparisons, there was significant unevenness. Also, the medium of the invention was relatively higher in optical reflection density than the Comparison Example. Furthermore, it was possible to obtain transferred images havng a high density at 60° C. and 80° C. with the invention, while no transfer resulted at these temperatures in the Comparison. Hence, with the thermographic transfer recording media of the invention, sensitivity can be raised and transferred images having high maximum density, no unevenness, and rich gradations can be obtained. It was also found that the thermographic transfer recording media of the invention avoids any unnecessary, accidental recording and the raw stability thereof is excellent.

EXAMPLE 2

Coating solution 3 was prepared by mixing (a) a solution of 2 g of polyvinyl butyral in 20 ml of methylethyl ketone and (b) a solution of 2 g of Paraffin Solid 32030 (Kanto Chemical Co., Japan) in 20 ml of toluene and then adding 0.3 g of Sumiplast Blue 3R (Sumitomo Chemical Co., Japan).

Solution 3 was coated by a wire-bar onto a condenser paper similar to that used in Example 1 to provide the coloring agent layer (2.8 μm dried thickness). Next, Coating Solution 2 was used as in Example 1 to provide the transferable layer (2.6 μm dried thickness) on the coloring agent layer. Thus, another thermographic transfer recording medium of the invention was obtained.

When transfer recording was attempted on plain paper in the same manner as in Example 1, a blue-colored transferred image, without any unevenness, was obtained. When the ironing temperatures were 60° C., 80° C., 100° C., and 120° C., the respective optical reflection densities were 0.20, 0.64, 1.04, and 1.46; thus, the optical reflection densities of the transferred image vary excellently with applied temperature.

When the medium obtained in this manner was brought into close contact, face to face, with the surface of a plain paper and some letters were written on the support side by a pencil (as done in Example 1), nothing was transferred onto the plain paper.

COMPARISON EXAMPLE 2

A transfer process similar to that of Example 2 was carried out except that only the coloring agent layer prepared with Solution 3 was coated thereon. A blue-colored transferred image with unevenness was obtained on the plain paper. When the ironing temperatures were 60° C., 80° C., 100° C. and 120° C., the respective optical reflection densities were 0.04, 0.38, 0.45, and 0.45. These densities are very low. Optical reflection densities of the transferred images could not be changed by altering the heating temperatures.

When the thermographic transfer recording medium obtained in Comparison Example 2 was tested by writing on the support side thereof with the coated side in contact with paper, a clear blue-colored transferred image resulted.

When comparing Example 2 with Comparison Example 2, it was found that in the invention sensitivity is increased, unevenness of the transferred image is reduced, and density is also increased. The thermographic transfer recording medium is just as good in raw stability as that of Example 1.

EXAMPLE 3

Coating solution 4 was prepared by mixing (a) a solution of 1.6 g of polyvinyl butyral in 20 ml of methylethyl ketone and (b) a solution of 2.4 g of Paraffin Solid 32030 (Kanto Chemical Co., Ltd., Japan) in toluene, and then adding 0.3 g of Sumika Print Cyanine Blue GN-O (Sumitomo Chemical Co., Japan) and dispersing for one hour in a hot water bath using a sand-mill.

Solution 4 was coated by a wire-bar onto a condenser paper similar to that used in Example 1 to provide a coloring agent layer having 2.7 μm dried thickness. Next, Solution 2 was applied as in Example 1 to provide the transferable layer (2.4 μm dried thickness) on the coloring layer. Thus, a further thermographic transfer recording medium of the invention was obtained.

When this medium was used in the same process as in Example 1, a blue-colored transferred image without unevenness was obtained on plain paper. When the ironing temperatures were 60° C., 80° C., 100° C., and 120° C., the respective optical reflection densities were 0.18, 0.52, 0.74 and 1.02. Excellent changes in the optical reflection density of the transferred image were possible.

When the thermographic transfer recording medium obtained was brought into close contact, face to face, with the surface of plain paper and some letters were written on the support side by a pencil (as in Example 1), nothing was transferred onto the plain paper.

COMPARISON EXAMPLE 3

The transfer process of Example 3 was applied to a thermographic transfer recording medium except that only a coloring agent layer prepared from Solution 4 was coated on the support. A blue-colored uneven transferred image was obtained on plain paper. When the ironing temperatures were 60° C., 80° C., 100° C. and 120° C., the respective optical reflection densities were 0.05, 0.14, 0.32 and 0.28, and the densities of the transferred images were low. The optical reflection density of the transferred images could not be satisfactorily varied with the heating temperatures.

When the thermographic transfer recording medium obtained in Comparison Example 3 was tested by writing on the support side in a manner analogous to that described in Example 3, a clear blue-colored transferred image was obtained.

When comparing Example 3 with Comparison Example 3, it was found that the thermographic transfer recording medium of the invention was excellent in sensitivity, high in maximum density, and was capable of obtaining a transferred image having a rich gradation without any unevenness. The Comparison Example could achieve none of these objects. The thermographic transfer recording medium of the invention also has excellent raw stability.

EXAMPLE 4

To 20 ml of water containing 1 g of gelatin, 4 g of azobenzene was added at 80° C. under stirring. The resulting solution was cooled to 50° C. and stirred with a sand-mill for 2 hours to prepare Coating Solution 5. Separately, in accordance with the method of dispersion described in Japanese Patent Application (OPI) 120393/1981, 2 g of beeswax was heated to a liquified state and a solution of an emulsifying agent, dissolved in a low-boiling heated solvent, was added. To the resulting solution, 20 ml of hot water was gradually added while stirring. The thus-prepared solution was used as Coating Solution 6.

Solution 5 was applied to a polyethylene terephthalate film (6 μm thick) by a wire-bar coater so as to form a coloring agent layer (dry thickness 3.2 μm). Coating Solution 6 was applied to the dry coloring agent layer and dried to form a transfer layer (2.4 μm thick). The resulting thermal transfer recording medium was referred to as sample S-1.

Figure 2:
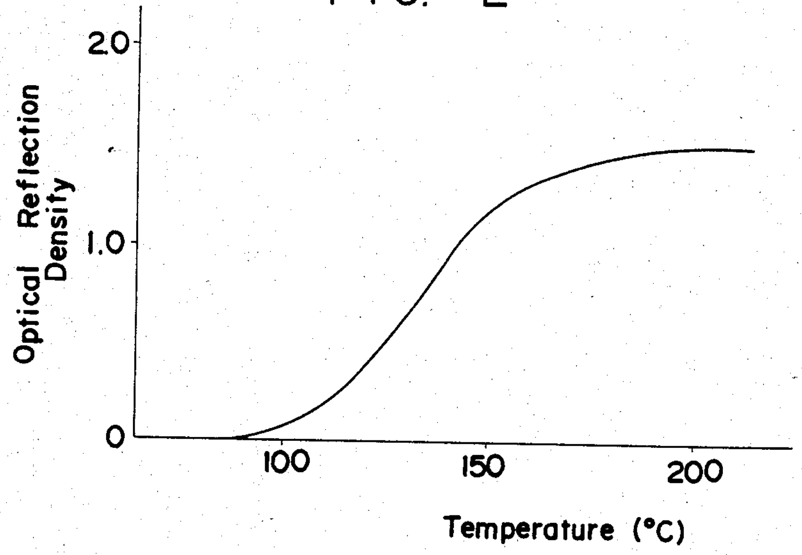
FIG. 2 is a graph showing the relationship between the temperature of the thermal head and the optical reflection density of the image.
Figure 3:
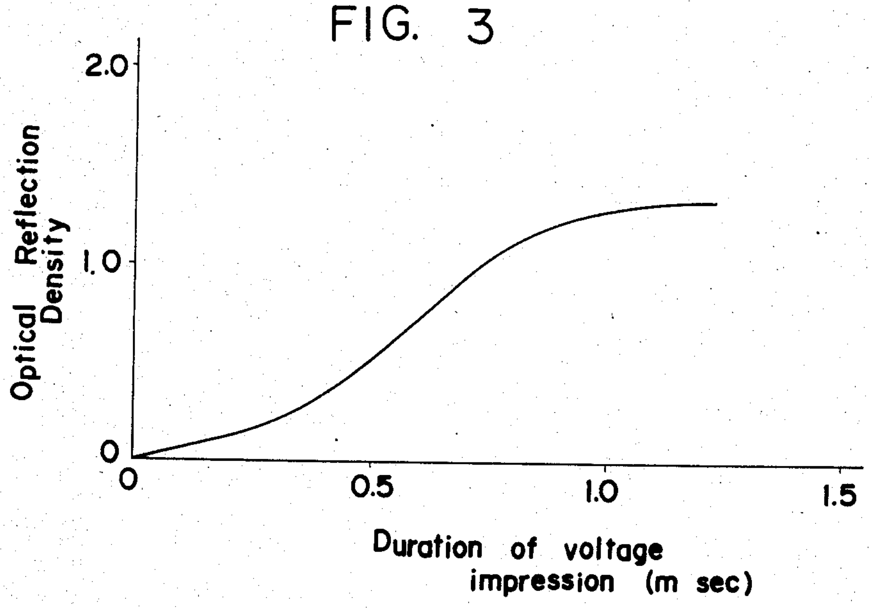
FIG. 3 is a graph showing the relationship between the duration of voltage impression and the optical reflection density of the image.

The sample was subjected to a thermal transfer recording test according to the following procedure. The coated surface of the sample was placed in contact with white plain paper. The support (see FIG. 1) was heated with thermal head 5 having heating element 6 to transfer transfer material 7 onto plain paper 4. The optical reflection density of the transferred image was measured with a reflection densitometer (produced by Konishiroku Photo Industry Co., Ltd.). In this transfer recording test, the temperature of thermal head 5 and the duration of voltage impression were varied so as to determine the relationship of each parameter with the reflection density of the image. The results are shown in FIGS. 2 and 3. FIG. 2 shows the relationship between the reflection density of the image and the heating temperature (with voltage impressed for a period of 0.8 msec.) and FIG. 3 shows the relationship between the reflection density of the image and the voltage impression period (with the temperature of the thermal head fixed at 150° C.).

Figure 4:
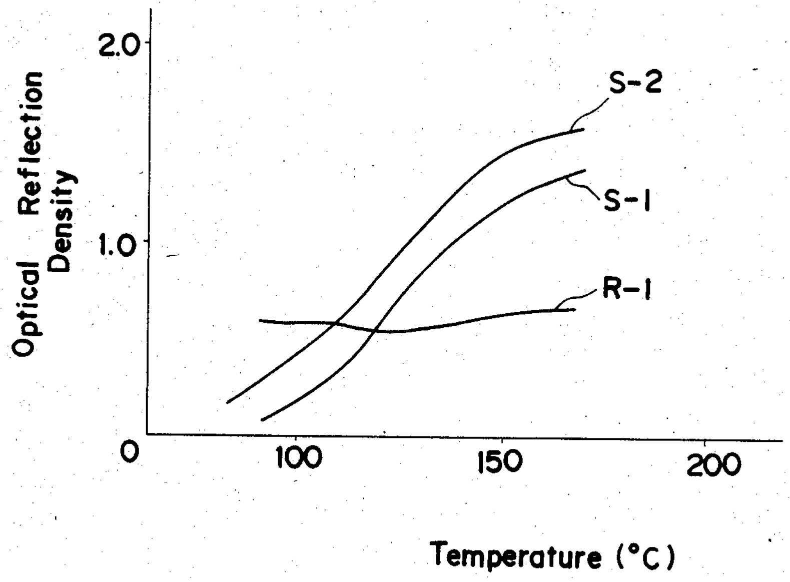
FIG. 4 is a graph showing the relationship of the thermal head temperature and optical reflection density.

When sample S-1 was placed into intimate contact with plain paper (image receiver) and heat was applied to the base with an iron for a period of 1 second at 100° C., 120° C. and 150° C., an orange-colored transfer image was formed on the plain paper. The results are indicated in FIG. 4 by curve S-1. The reflection densities at 100° C., 120° C. and 150° C. were 0.20, 0.57 and 1.17, respectively. Therefore, sample S-1 of the thermal transfer recording medium of the present invention could produce varying optical reflection densities according to the heating temperature.

EXAMPLE 5

Recording medium Sample S-2 was prepared by repeating the procedure of Example 4 except that the azobenzene was replaced by 2 g of N,N-dimethyl-m-nitroaniline. The sample was subjected to the same transfer tests as in Example 4 and the optical reflection densities of the red image formed were measured at various iron temperatures. The reflection densities at 100° C., 120° C. and 150° C. were 0.35, 0.82 and 1.41, respectively. The results are shown in FIG. 4 by curve S-2. This data shows that sample S-2 of the thermal transfer recording medium of the present invention could also produce varying optical reflection densities according to the heating temperature.

COMPARATIVE EXAMPLE 4

A mixture of 20 ml each of Solutions 5 and 6 which were prepared in Example 4 was applied to a polyethylene terephthalate film base (6 μm thick) with a wire-bar coater and dried to form thermal transfer recording medium sample R-1 (3.5 μm thick). The sample was subjected to the same transfer tests as in Example 4, and the results are shown by curve R-1 in FIG. 4. The optical reflection densities at iron temperatures of 100° C., 120° C. and 150° C. were 0.51, 0.44 and 0.63, respectively. It was impossible to produce transfer images that had reflection densities which varied according to the heating temperature.

EXAMPLE 6

A coating solution having the composition indicated below was applied to a polyethylene terephthalate film base (6 μm thick) with a wire-bar coater to give a wet thickness of 59.4 μm. The web was dried to form a coloring agent layer.

| | |
|---|---|
| Cellulose diacetate | 0.6 g |

-continued

| | |
|---|---|
| Sublimable magenta dye (1) | 0.3 g |
| Acetone | 20 ml |

Dye (1)

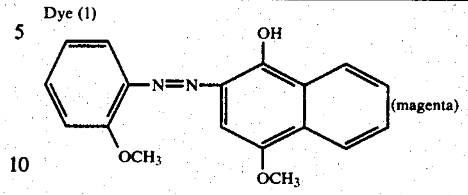

The coloring agent layer was overlaid with a transfer layer (wet thickness: 27.4 μm) formed from a coating solution having the composition indicated below. The web was dried to form thermal transfer recording medium sample S-3.

| | |
|---|---|
| Permalin PN (heat-fusible material produced by Sanyo Chemical Industries, Ltd.) | 10 ml |
| $H_2O$ | 10 ml |
| 2% Anionic surfactant | 0.3 ml |

Sample S-3 could produce a wide range of gradation in tone by simply changing the temperature of thermal head 5 or the duration of voltage impression.

EXAMPLES 7 TO 9 AND COMPARATIVE EXAMPLES 5 TO 7

Thermal transfer recording medium sample S-4 was prepared as in Example 6 except that dye (1) was replaced by the yellow dye (2). Sample S-5 was likewise prepared except that dye (2) was replaced by blue dye (3). Sample S-6 was prepared as in Example 4 except that Permalin PN in the transfer layer was replaced by carnauba wax.

Comparative samples R-2, R-3 and R-4 were prepared. They were the same as samples S-3 to S-5 except that they had no transfer layer.

Dye (2):

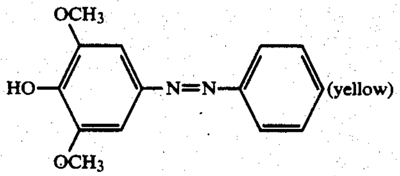

Dye (3):

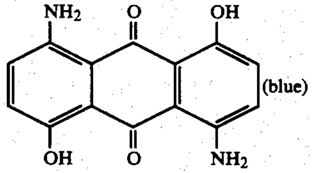

Samples S-4 to S-6 and Comparative Samples R-2 to R-4 were superimposed on sheets of plain paper image receivers, with the coated surface placed in contact therewith. A thermal plate (4×1 cm) having a surface temperature of 150° C. was pressed against the base film for one second. The reflection densities of the images transferred to the plain paper were measured, and the results are shown in Table 1. Samples S-3 to S-6 according to the present invention produced transfer images having higher densities than those produced by comparative samples R-2 to R-4.

The plain paper sheets with transferred images were left at 80° C. for one week. The densities of the images produced by samples S-3 to S-5 decreased only slightly, but the images produced by comparative samples R-3 and R-4 suffered a significant decrease in their densities.

The thermal stability of the respective images was checked by measuring the optical density before exposure to 80° C. for one week ($Do^1$) and the density after the exposure ($D^1$) in terms of λ max. The results are shown in Table 1 wherein the percent thermal stability is indicated by D/Do×100.

TABLE 1

| Parameter Sample No. | Reflection density | Percent thermal stability |
|---|---|---|
| S-3 | 1.75 | 86 |
| S-4 | 1.90 | 80 |
| S-5 | 1.60 | 90 |
| S-6 | 1.65 | 83 |
| R-2 (comparative sample) | 0.95 | 70 |
| R-3 (comparative sample) | 1.05 | 55 |
| R-4 (comparative sample) | 0.85 | 75 |

As is clear from Table 1, samples S-3 to S-6 (the present invention) produced images having much higher reflection densities and had better thermal stability (fixability) than those obtained by comparative samples R-2 to R-4.

While the preferred embodiments of the present invention have been described by reference to the use of a thermal head and thermal plate as heating elements for transferring the transfer material from the recording medium, it should be understood that other heating elements may be used, including helium-neon lasers, $CO_2$ lasers and YAG lasers.

What we claim is:

1. A thermographic transfer recording medium comprising a support, a transfer layer containing a low melting point compound having a melting point or softening point in the range of 45° C. to 150° C. and capable of dissolving or dispersing a coloring agent at the time of being fused, and a coloring agent layer provided between said support and said transfer layer, said coloring agent layer containing said coloring agent and a non heat-fusible polymer having a melting point or softening point at least 50° C. higher than that of said low melting point compound as a bonding agent.

2. The medium of claim 1 wherein said coloring agent layer further contains said low melting point compound.

3. The medium of claim 2 wherein said coloring agent layer comprises by weight about 5 to about 95% of said bonding agent, about 5 to about 50% of said coloring agent and 0% to about 80% of said low melting point compound.

4. The medium of claim 1 wherein said non heat-fusible polymer is selected from the class consisting of polyvinyl butyral, polyesters, polyvinyl chloride, polycarbonates, polyvinyl alcohols, polystyrenes, polyvinyl chloride-vinyl acetate copolymer, polyvinyl formal, polyethylene telephthalate, polyethylene, polyvinylidene chloride and polyamides.

5. The medium of claim 1 wherein said low melting point compound is selected from the group consisting of plant waxes, animal waxes, petroleum waxes, mineral waxes, higher fatty acids, higher alcohols, higher fatty acid esters, and lower amides.

6. The medium of claim 5 wherein said low melting point compound is selected from the group consisting of paraffin waxes, carnauba waxes, and ester waxes.

7. The medium of claim 1 wherein said coloring agent is selected from the group consisting of dyes and pigments.

8. The medium of claim 1 wherein said coloring agent is a non-dye compound having predominant absorption in the visible wavelength in the range of from 400 nm to 800 nm and having a melting point in the range of 45° C. to 200° C.

9. The medium of claim 1 wherein said support is selected from the group consisting of condenser papers, polyethylene telephthalate films and aluminum foils.

10. The medium of claim 1 which further comprises a layer selected from the group consisting of an overcoat layer, an intermediate layer, and a subbing layer.

11. A thermographic transfer recording medium comprising a support, a transfer layer containing a low melting point compound capable of dissolving or dispersing a coloring agent at the time of being fused, and a coloring agent layer provided between said support and said transfer layer, said coloring agent layer containing said coloring agent and a non-heat fusible polymer as a bonding agent.

12. The medium of claim 11 wherein said coloring agent layer contains a low melting point compound capable of dissolving or dispersing a coloring agent at the time of being fused, said coloring agent low melting point compound being the same as or different from the low melting point compound of the transfer layer.

13. The medium of claim 12 wherein said coloring agent low melting point compound is the same as the low melting point compound of the transfer layer.

14. The medium of claim 12 wherein said coloring agent low melting point compound is different from the low melting point compound of the transfer layer.

15. The medium of claim 12 wherein said transfer layer low melting point compound and said coloring agent low melting point compound are selected from the group consisting of plant waxes, animal waxes, petroleum waxes, mineral waxes, higher fatty acids, higher alcohols, higher fatty acid esters, and low amides.

16. The medium of claim 15 wherein said transfer layer low melting point compound and coloring agent layer low melting point compound are selected from the group consisting of paraffin waxes, carnauba waxes, and ester waxes.

17. The medium of claim 11 wherein said low melting point compound is selected from the group consisting of plant waxes, animal waxes, petroleum waxes, mineral waxes, higher fatty acids, higher alcohols, higher fatty acid esters, and lower amides.

18. The medium of claim 17 wherein said low melting point compound is selected from the group consisting of paraffin waxes, carnauba waxes, and ester waxes.

* * * * *